United States Patent
Hu et al.

[11] Patent Number: 5,961,343
[45] Date of Patent: Oct. 5, 1999

[54] STRAIN RELIEF CLAMP FOR SUPPORTING FLEXIBLE RIBBON CABLES

[75] Inventors: Paul Yu-Fei Hu; Rudolph Manuel Lopez, both of Tucson, Ariz.

[73] Assignee: International Business Machines, Armonk, N.Y.

[21] Appl. No.: 09/013,489

[22] Filed: Jan. 26, 1998

[51] Int. Cl.$^6$ ................................................. H01R 13/58
[52] U.S. Cl. ........................................... 439/449; 439/472
[58] Field of Search ................................... 439/449, 470, 439/472

[56] References Cited

U.S. PATENT DOCUMENTS

| | | | |
|---|---|---|---|
| 4,448,474 | 5/1984 | Melnychenko | 439/472 |
| 5,550,694 | 8/1996 | Hyde | 360/104 |
| 5,639,259 | 6/1997 | Wellinsky | 439/470 |

Primary Examiner—Paula Bradley
Assistant Examiner—Katrina Davis
Attorney, Agent, or Firm—Robert B. Martin

[57] ABSTRACT

Disclosed is a strain relief clamp for supporting one or more flexible ribbon cables. A first stiff member has an indentation wider than a flexible ribbon cable, and a height less than the thickness of a flexible ribbon cable. Stacked pliant members are stacked on the first stiff member. Each pliant member has an indentation on the side facing away from the first stiff member. The indentations are substantially equal in width and height to the indentation of the first stiff member. A second stiff member is located on the end of the stack opposite the first stiff member and has a protrusion at least as wide as a flexible ribbon cable facing the indentation of the adjacent pliant member. The protrusion height is such that the sum of its height and the thicknesses of the flexible ribbon cables is greater than the sum of the heights of the indentations of the first stiff member and of the stacked pliant members. Thus, upon clamping the members together, the flexible ribbon cables are compressed when placed in the indentations of the first stiff member and the stacked pliant member adjacent the second stiff member protrusion, providing strain relief of the flexible ribbon cables. The surfaces of the members engaging the flexible ribbon cables each may be textured to improve the friction characteristics.

28 Claims, 5 Drawing Sheets

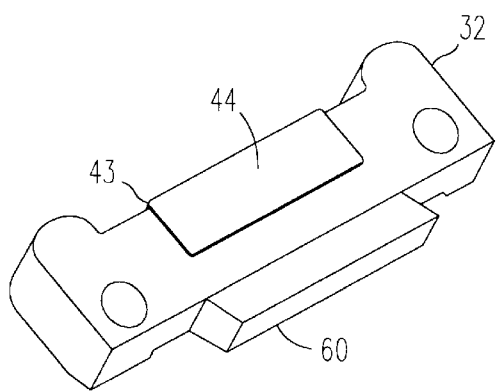
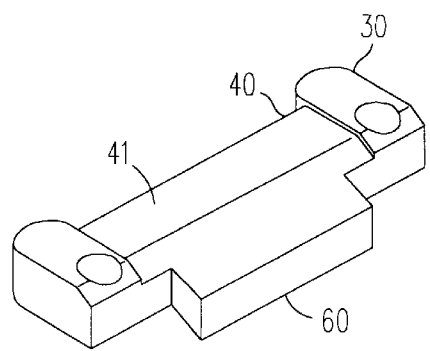
FIG. 4A  FIG. 4B
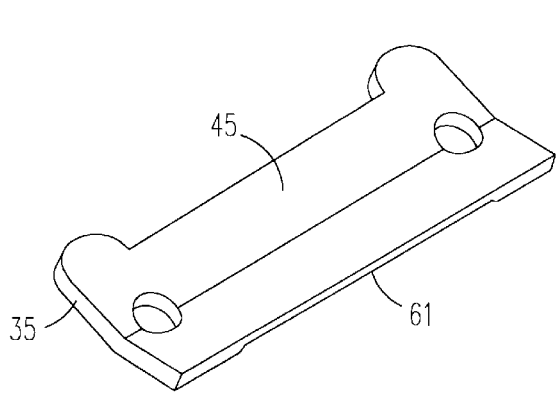
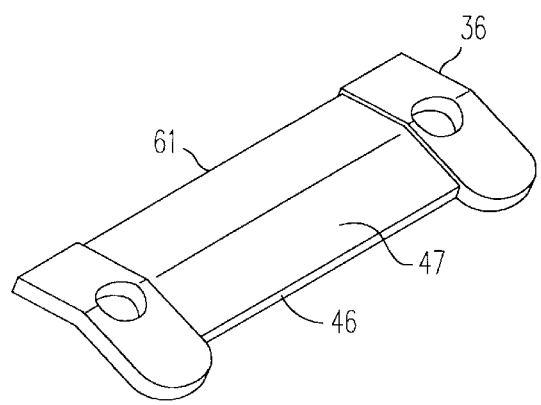
FIG. 5A  FIG. 5B

STRAIN RELIEF CLAMP FOR SUPPORTING FLEXIBLE RIBBON CABLES

TECHNICAL FIELD

This invention relates to strain relief clamps, and, more particularly, to clamps which compress and support flexible ribbon cables with respect to an attached connection to thereby provide strain relief for the cables with respect to the connection.

BACKGROUND OF THE INVENTION

Magnetic heads employed for the recording and retrieval of data on a data recording media, such as magnetic tape, are typically multitrack devices having a plurality of electrical conductors for receiving and transmitting the data with respect to one or more data channels.

The conductors are conventionally one or more flexible ribbon cables which are bonded at electrical connections on the head. The bonding, for example, thermo compression bonding, is very fragile to movement or stress.

Higher capacity magnetic tape devices have more data recording tracks than tracks on the magnetic head, and conventionally employ servo systems for moving the head back and forth across the tape to interface with different sets of tracks. This movement of the head and connected flexible ribbon cable(s), while the data channel connections at the other end of the flexible ribbon cable(s) are stationary, tends to stress the head/cable bonded connections. Thus, it would be advantageous to provide a strain relief for the flexible ribbon cable(s) for the head/cable bonded connections.

SUMMARY OF THE INVENTION

It is an object of the present invention to provide an effective strain relief for flexible ribbon cable(s) for the head/cable bonded connections.

Disclosed is a strain relief clamp for supporting one or more flexible ribbon cables. A first stiff member has an indentation which is wider than one of the flexible ribbon cables, and which has a height less than the thickness of one of the flexible ribbon cables. Stacked pliant members are stacked on the first stiff member, each pliant member having a first surface which may be substantially flat on the side facing the first stiff member and having an indentation on the side facing away from the first stiff member, the indentation substantially equal in width and height to the indentation of the first stiff member. A second stiff member is located on the end of the stack opposite the first stiff member and has a protrusion at least as wide as one of the flexible ribbon cables facing the indentation of the adjacent pliant member, the protrusion having a height such that the sum of its height and the thicknesses of the flexible ribbon cables is greater than the sum of the heights of the indentations of the first stiff member and of the stacked pliant members. Thus, upon clamping the members together, the flexible ribbon cables are compressed when placed, respectively, in the indentation of the first stiff member and in the indentation of the stacked pliant member adjacent the second stiff member protrusion, providing strain relief of the flexible ribbon cables.

At least a portion of the indentation of the first stiff member, at least a portion of the flat surface of the one of the pliant members facing the first stiff member, and at least a portion of the indentation of the one of the pliant members facing the protrusion of the second stiff member, each may have a flat textured engagement surface for engaging the flexible ribbon cables. The texturing increases the friction characteristics between the members and the cable, and the texturing is sufficiently fine that it is unlikely to leave an imprint on the cable. The flat textured engagement surfaces are at least as wide as the engaged flexible ribbon cable.

The protrusion of second firm member may be partially open to allow precision molding and provides an engagement surface on at least portions of the total area of the protrusion. The engagement surface portions lie in a common flat plane and may be textured.

The stiff and pliant members may additionally have a second portion inclined at an angle from each of the engagement surfaces, the inclined portions having the same angle with respect to the engagement surfaces for directing the plurality of flexible ribbon cables at the angle.

The stiff members may comprise a common part, as may each of the pliant members, thereby increasing the cost effectiveness of the strain relief.

An advantage of the present invention is that the flexible ribbon cables are separated from each other at the strain relief, thereby minimizing cross-talk between signals on the conductors of the cables.

For a fuller understanding of the present invention, reference should be made to the following detailed description taken in conjunction with the accompanying drawings.

BRIEF DESCRIPTION OF THE DRAWINGS

FIGS. 4A and 4B are isometric representations of opposite sides of the stiff members of the strain relief clamp of FIGS. 1–3;

FIGS. 5A and 5B are isometric representations of opposite sides of the pliant members of the strain relief clamp of FIGS. 1–3;

DETAILED DESCRIPTION OF THE INVENTION

Figure 1:
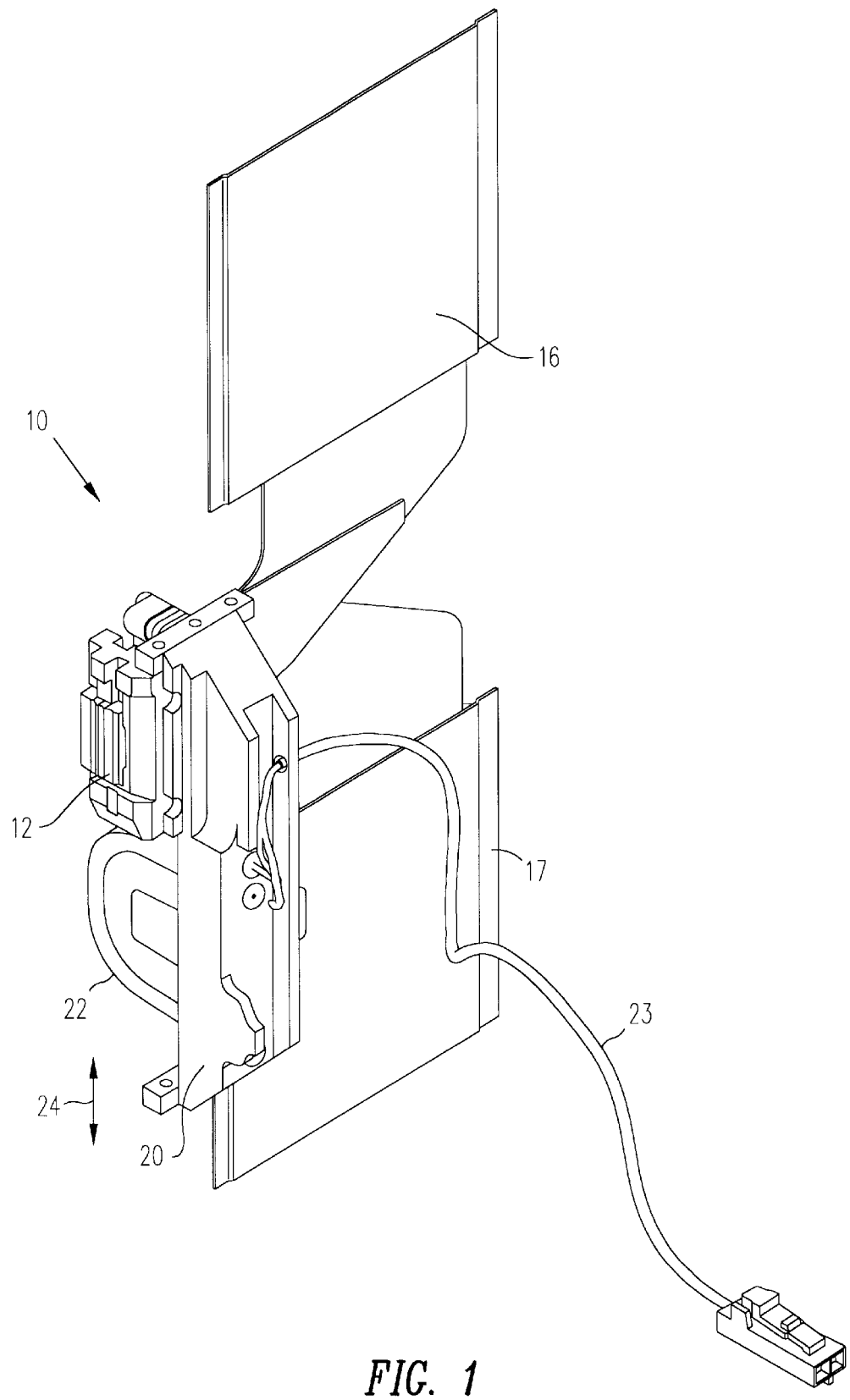
FIG. 1 is an isometric representation of a magnetic head, flexible ribbon cables, servo actuator and strain relief clamp in accordance with one embodiment of the present invention.
Figure 2:
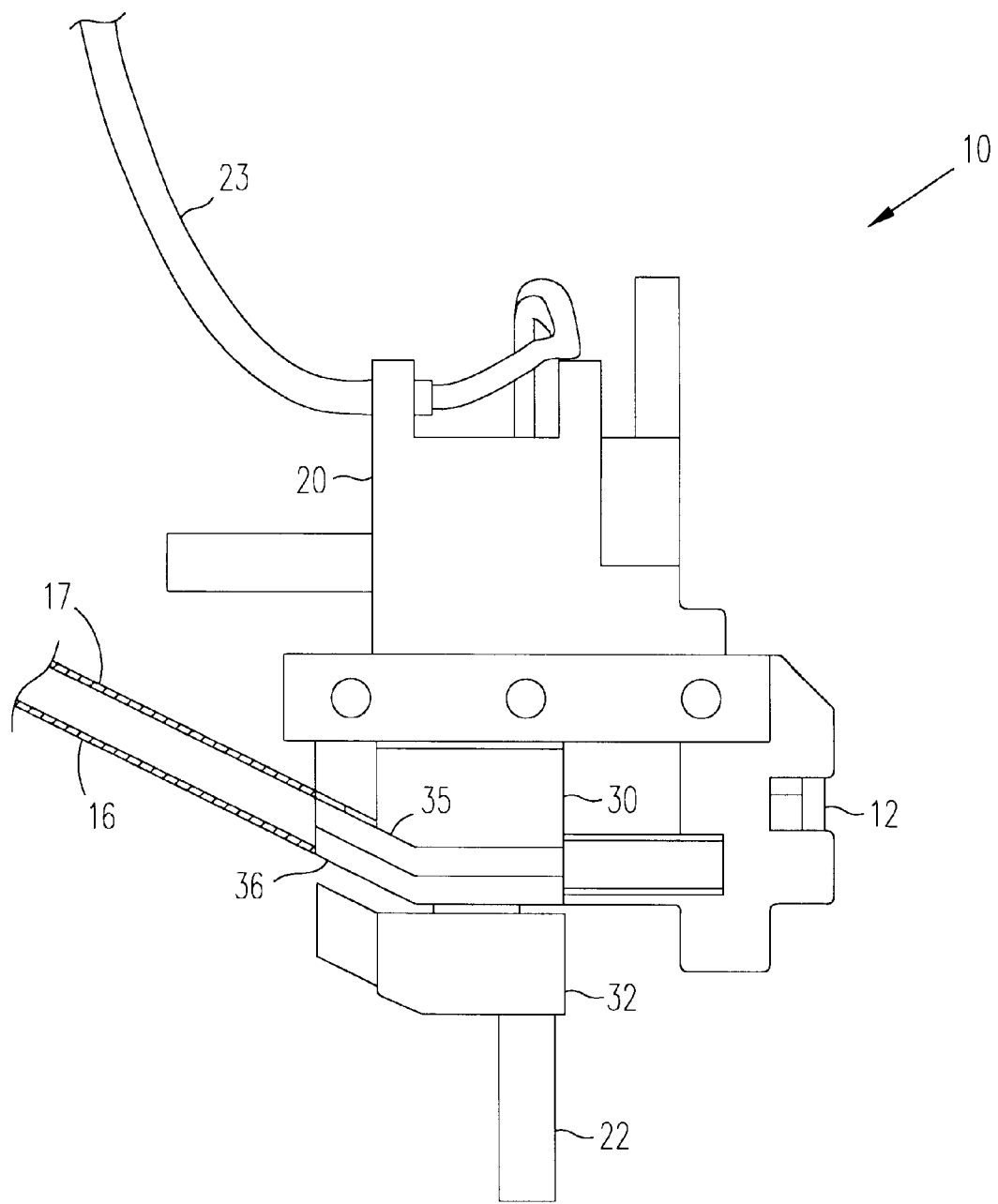
FIG. 2 is a side view of the magnetic head, flexible ribbon cables and strain relief clamp of FIG. 1.
Figure 3:
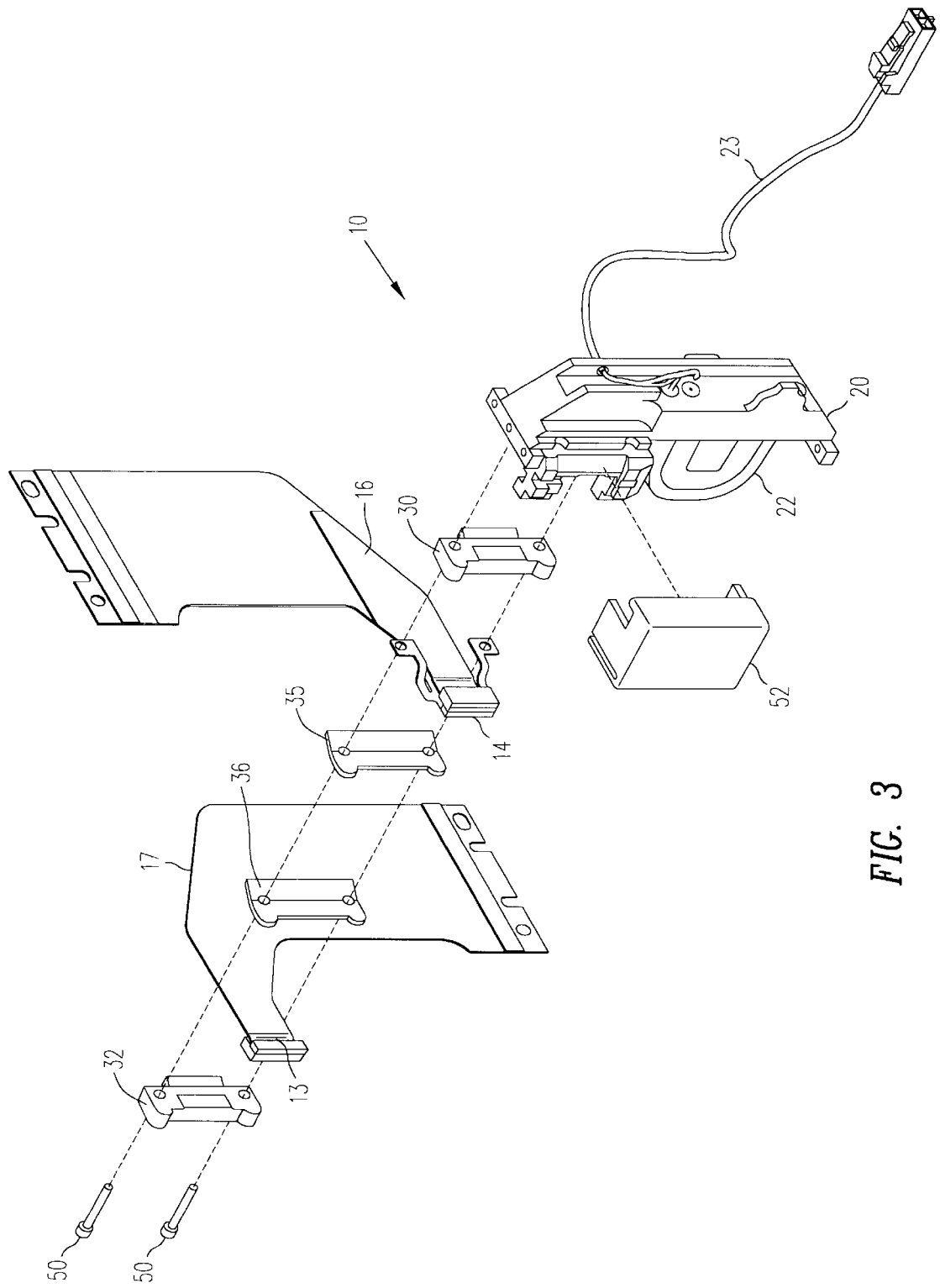
FIG. 3 is an exploded representation of the magnetic head, flexible ribbon cables, servo actuator and strain relief clamp of FIGS. 1 and 2.

Referring to FIGS. 1–3, a magnetic tape head assembly 10 is illustrated having a magnetic tape head 12 (shown as exploded into two parts 13 and 14 in FIG. 3). The magnetic head records and retrieves data on a data recording media, such as magnetic tape, and may be a multitrack device having a plurality of electrical conductors for receiving and transmitting the data with respect to one or more data channels. Flexible ribbon cables 16 and 17 are each electrically connected to the head in conventional fashion, which may comprise bonding, for example, thermo compression bonding, which is very fragile to movement or stress.

Higher capacity magnetic tape devices have more data recording tracks than tracks on the magnetic head, and conventionally employ servo systems for moving the head back and forth across the tape to interface with different sets of tracks. The magnetic head 12 is mounted on a carriage 20 which has a coil 22 which may receive a servo current on twisted pair 23. The current in the coil interacts with a fixed permanent magnet (not shown) on the tape drive to move the carriage 20 to seek back and forth in the direction of arrows 24 to selected sets of tracks. This movement of the magnetic head 12 and connected flexible ribbon cables 16 and 17, while the data channel connections (not shown) at the other end of the flexible ribbon cables are stationary, tends to stress the head/cable bonded connections.

In accordance with one embodiment of the present invention, a strain relief clamp is provided for supporting the flexible ribbon cables 16 and 17 at the ends connected to the head 12. In the illustrated embodiment, a stack of four elements is provided for supporting the two flexible ribbon cables. The elements comprise first and second stiff members 30 and 32, and first and second pliant members 35 and 36, respectively. In accordance with one aspect of the present invention, stiff members 30 and 32, and pliant members 35 and 36 are each a common part. By making two common parts, rather than four separate parts, the mass production costs of the parts are significantly reduced. With respect to the stiff members 30 and 32, only one side of the member is important to the invention for each use when stacked in place, as will be described.

As illustrated in FIGS. 4A and 4B, first stiff member 30 has an indentation 40 wider than one of the flexible ribbon cables, and a height less than the thickness of one of the flexible ribbon cables. At least a portion of the indentation 40 of the first stiff member 30 may have a flat textured engagement surface 41 for engaging a flexible ribbon cable, as will be explained.

The second stiff member 32 is located on the end of the stack opposite the first stiff member and has a protrusion 43 at least as wide as one of the flexible ribbon cables. The protrusion 43 may be solid, or, may be partially open to allow precision molding. The remaining portions of the total area of the protrusion comprises an engagement surface 44 on at least portions of the total area of the protrusion for engaging a flexible ribbon cable, which will be explained. The engagement surface portions lie in a common flat plane and may be textured.

Referring to FIGS. 5A and 5B, pliant members 35 and 36 each has a substantially flat surface 45 on the side (when stacked) facing the first stiff member, and an indentation 46 on the side facing away from the first stiff member. The indentation 46 is substantially equal in width and height to the indentation 40 of the first stiff member 30 in FIG. 4B. At least a portion of the indentation 46 of the pliant member 36 may have a flat textured engagement surface 47 for engaging a flexible ribbon cable, as will be explained. The pliant members 35 and 36 may be molded of the same material as stiff members 30 and 32, but are sufficiently thin so as to become pliant and be able to bow, as will be explained.

Figure 6:
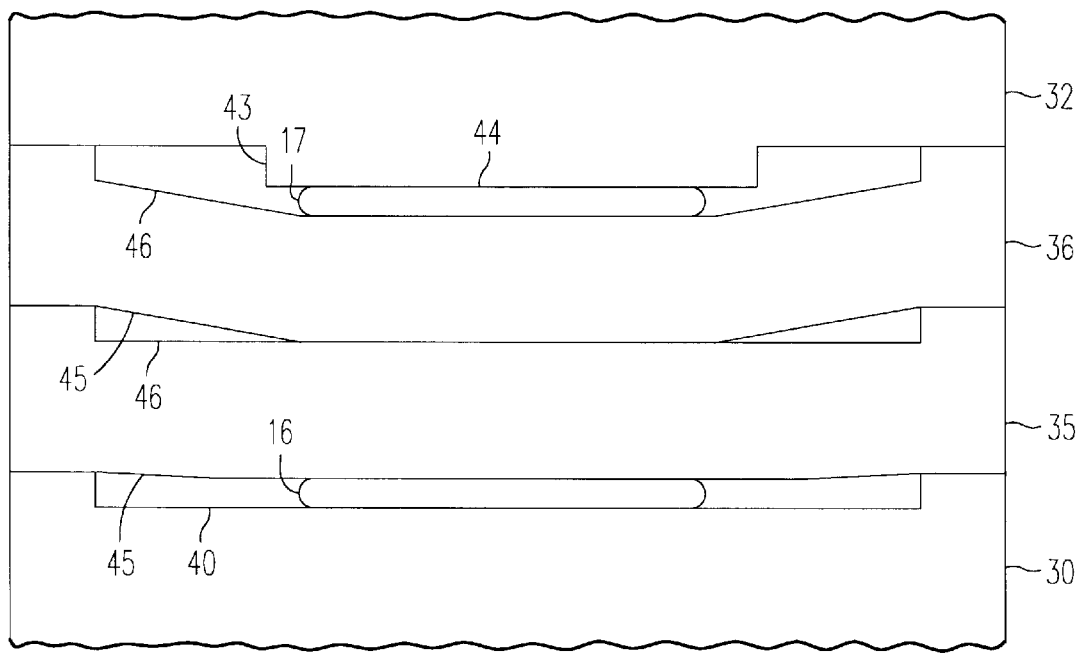
FIG. 6 is a frontal view of the strain relief clamp of FIGS. 1–3.

Referring additionally to FIG. 6, the members are shown in the assembled, stacked arrangement with the flexible ribbon cables 16 and 17.

One of the flexible ribbon cables 16 is placed in the indentation 40 of the first stiff member 30, and one of the pliant members 35 is stacked thereon with the substantially flat surface 45 towards the cable and the first stiff member indentation 40. The indentation 46 is therefore on the side of member 35 facing away from the first stiff member 30. The next pliant member 36 is stacked on the pliant member 35, again with the substantially flat surface 45 towards the cable and the first stiff member indentation 40. Thus, the indentation 46 is on the side of member 36 facing away from the first stiff member 30.

The other flexible ribbon cable 17 is placed in the indentation 46 of the pliant member 36.

The second stiff member 32 is located on the end of the stack opposite the first stiff member 30 with the protrusion 43, which is at least as wide as the flexible ribbon cable 17, facing the flexible ribbon cable in the indentation 46 of the adjacent pliant member 36. In accordance with the present invention, the protrusion 43 has a height such that the sum of its height and the thicknesses of the flexible ribbon cables is greater than the sum of the heights of the indentations of the first stiff member and of the stacked pliant members. Thus, upon clamping the members together, the flexible ribbon cables are compressed when placed, respectively, in the indentation 40 of the first stiff member 30 and in the indentation 46 of the stacked pliant member 36 adjacent the second stiff member protrusion 43, providing strain relief of the flexible ribbon cables.

As illustrated in FIG. 6, the pliant members 35 and 36 flex under the compression pressure of protrusion 43 to transfer compression force from protrusion 43 to surface 45 of pliant member 35, and equalize the compression force on the flexible ribbon cables 17 and 16.

As an example, assuming the flexible ribbon cables are about 0.30 mm in thickness, indentation 40 in first stiff member 30 and indentations 46 in pliant members 35 and 36 may be selected to be 0.24 mm in height. Thus, protrusion 43 must be about 0.30 mm in height so that the sum of its height and the thicknesses of the flexible ribbon cables is about 0.90 mm, which is greater than the sum of the heights of the indentations of the first stiff member and of the stacked pliant members of about 0.72 mm.

Referring additionally to FIG. 3, screws 50 clamp the assembly together, and onto carriage 20, providing a high compression force on the flexible ribbon cables 16 and 17, thereby holding the flexible ribbon cables fixed with respect to magnetic head 14, and thus providing strain relief with respect to the electrical connections between the flexible ribbon cables and the magnetic head. A cover 52 may be provided to protect the magnetic tape head during subsequent assembly into a tape drive.

Additional flexible ribbon cables may also be clamped in the assembly to provide strain relief. At least one additional pliant member is required for each added flexible ribbon cable, and the cable is placed in the indentation 46 of the additional pliant member. The height of the protrusion 43 must be determined accordingly to provide the correct compression force when clamped together, as described above.

Figure 7:
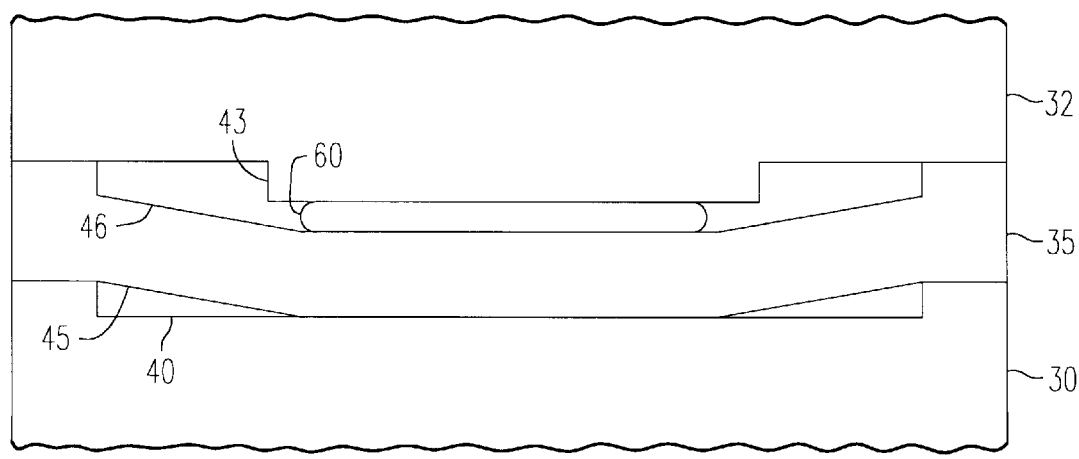
FIG. 7 is a frontal view of an alternative embodiment of the strain relief clamp of FIGS. 1–3.

An alternative embodiment is illustrated in FIG. 7 for a single flexible ribbon cable 60. The embodiment lacks the pressure equalization of the multiple pliant members 35 and 36 of the embodiment of FIG. 6, but provides compression of the cable 60 when clamped together. One pliant member 35 is stacked on the first stiff member 30, which has the indentation 40. The substantially flat surface 45 of the pliant member 35 is facing towards the first stiff member indentation 40. The indentation 46 is therefore on the side of member 35 facing away from the first stiff member 30. The flexible ribbon cable 60 is placed in the indentation 46 of the pliant member 35.

The second stiff member 32 is located on the end of the stack opposite the first stiff member 30 with the protrusion 43, which is at least as wide as the flexible ribbon cable 60, facing the flexible ribbon cable in the indentation 46 of the adjacent pliant member 35. In accordance with the present invention, the protrusion 43 has a height such that the sum of its height and the thickness of the flexible ribbon cable 60 is greater than the sum of the heights of the indentations of the first stiff member 30 and of the stacked pliant member 35. Thus, upon clamping the members together, the flexible ribbon is compressed when placed in the indentation 46 of the stacked pliant member 35 adjacent the second stiff member protrusion 43, providing strain relief of the flexible ribbon cable.

Alternative arrangements of the indentations and the substantially flat surfaces may be employed equally well from the standpoint of the present invention, for example, indentations of lower heights may be provided on both sides of the pliant members. In such an arrangement, the second indentations are considered to be the equivalent of the substantially flat surfaces 45 and the indentations 46 of the pliant members. The height of the second stiff member protrusion 43 will thus be calculated using all indentations in the stack to generate the correct compression pressure.

The flexible ribbon cables are typically made of a polyimide material on both the bottom and the top covers. Polyimide endures high temperature conditions and can therefore tolerate high current flow. Thus, although not all applications involve such conditions, the use of polyimide is commonly used for flexible ribbon cables. A difficulty is that polyimide has a low coefficient of friction. With reference to FIG. 6, in accordance with the present invention, at least a portion of the indentation 40 of the first stiff member 30, at least a portion of the flat surface 45 of the one of the pliant members 35 facing the first stiff member, and at least a portion of the indentation 46 of the one of the pliant members 36 facing the protrusion 43 of the second stiff member 32, each may have a flat textured engagement surface for engaging the flexible ribbon cables. The flat textured engagement surfaces are at least as wide as the engaged flexible ribbon cable. The protrusion 43 of second firm member 32 may be partially open to allow precision molding and provides an engagement surface 44 on at least portions of the total area of the protrusion. The engagement surface portions lie in a common flat plane and may be textured.

The texturing in accordance with the present invention improves the friction characteristics between the cable and the clamp, so that the same normal force at the clamp will allow a greater pull force on the strain relief. Additionally, the texturing is sufficiently fine that it is unlikely to leave an imprint on the cable. For example, the texturing roughness RMS value should be 8–12 microns.

As illustrated in FIGS. 4A, 4B, 5A and 5B, the stiff and pliant members may additionally have a second portion 60 and 61, respectively, which is inclined at an angle from each of the engagement surfaces. The inclined portions 60 and 61 have the same angle with respect to the engagement surfaces for directing the plurality of flexible ribbon cables at the angle. The inclined portions both provide some additional strain relief, and provide proper orientation of the flexible ribbon cables for connection to the data channels (not shown).

Referring to FIG. 2, an advantage of the present invention is that the flexible ribbon cables 16 and 17 are separated from each other by the pliant members 35 and 36, to thereby minimize cross-talk between signals of the conductors of the respective cables.

While the preferred embodiments of the present invention have been illustrated in detail, it should be apparent that modifications and adaptations to those embodiments may occur to one skilled in the art without departing from the scope of the present invention as set forth in the following claims.

We claim:

1. A strain relief clamp for supporting two flexible ribbon cables, comprising:

a first stiff member having an indentation wider than one of said flexible ribbon cables, and a height less than the thickness of one of said flexible ribbon cables;

two stacked pliant members, said pliant members stacked on said first stiff member, each pliant member having a first surface on the side facing said first stiff member and an indentation on the side facing away from said first stiff member, said indentation substantially equal in width and height to said first stiff member indentation; and a second stiff member stacked on said pliant members having a protrusion at least as wide as one of said flexible ribbon cables facing said indentation of the adjacent said pliant member, said protrusion having a height such that the sum of said height and the thicknesses of said two flexible ribbon cables is greater than the sum of the heights of said indentations of said first stiff member and of said two stacked pliant members, so that, upon clamping said members together, said two flexible ribbon cables are compressed when placed, respectively, in said indentation of said first stiff member and in said indentation of the stacked pliant member adjacent said second stiff member protrusion, to provide strain relief of said flexible ribbon cables.

2. The strain relief clamp of claim 1, wherein at least a portion of said indentation of said first stiff member, at least a portion of said first surface of the one of said pliant members facing said first stiff member, and at least a portion of said indentation of the one of said pliant members facing said protrusion of said second stiff member, each has a flat engagement surface for engaging said flexible ribbon cables, said portions at least as wide as one of said flexible ribbon cables.

3. The strain relief clamp of claim 2, wherein each of said stiff members comprises a common part; and wherein each of said pliant members comprises a common part.

4. The strain relief clamp of claim 2, wherein each of said flat engagement surfaces is textured.

5. The strain relief clamp of claim 4, wherein said second firm member protrusion provides an engagement surface on at least portions of the total area of said protrusion, said engagement surface portions being textured and lying in a common flat plane.

6. A strain relief assembly for providing strain relief between two flexible ribbon cables and a connector, comprising:

a first stiff member having an indentation wider than said flexible ribbon cables, and a height less than the thickness of one of said flexible ribbon cables;

two stacked pliant members, said pliant members stacked on said first stiff member, each pliant member having a first surface on the side facing said first stiff member and an indentation on the side facing away from said first stiff member, said indentation substantially equal in width and height to said first stiff member indentation;

a second stiff member stacked on said pliant members having a protrusion at least as wide as one of said flexible ribbon cables facing said indentation of the adjacent said pliant member, said protrusion having a height such that the sum of said height and the thicknesses of said two flexible ribbon cables is greater than the sum of the heights of said indentations of said first stiff member and of said two stacked pliant members, so that, upon clamping said members together, said two flexible ribbon cables are compressed when placed, respectively, in said indentation of said first stiff member and in said indentation of the stacked pliant member adjacent said second stiff member protrusion; and a support for mounting said clamped members and said connector, for fixing said clamped members and said flexible ribbon cables with respect to said connector, to provide strain relief of said flexible ribbon cables.

7. The strain relief assembly of claim 6, wherein at least a portion of said indentation of said first stiff member, at least a portion of said first surface of the one of said pliant members facing said first stiff member, and at least a portion of said indentation of the one of said pliant members facing said protrusion of said second stiff member, each has a flat engagement surface for engaging said flexible ribbon cables, said portions at least as wide as one of said flexible ribbon cables.

8. The strain relief clamp of claim 7, wherein each of said stiff members comprises a common part; and wherein each of said pliant members comprises a common part.

9. The strain relief assembly of claim 7, wherein each of said flat engagement surfaces is textured.

10. The strain relief assembly of claim 9, wherein said second firm member protrusion provides an engagement surface on at least portions of the total area of said protrusion, said engagement surface portions being textured and lying in a common flat plane.

11. A servo operated magnetic head assembly for moving said magnetic head with respect to a magnetic media, comprising:

a magnetic head having at least one electrical multiconductor connector;

two flexible ribbon cables electrically connected to said at least one electrical multiconductor connector;

a first stiff member having an indentation wider than said flexible ribbon cables, and a height less than the thickness of one of said flexible ribbon cables;

two stacked pliant members, said pliant members stacked on said first stiff member, each pliant member having a first surface on the side facing said first stiff member and an indentation on the side facing away from said first stiff member, said indentation substantially equal in width and height to said first stiff member indentation;

a second stiff member stacked on said pliant members having a protrusion at least as wide as one of said flexible ribbon cables facing said indentation of the adjacent said pliant member, said protrusion having a height such that the sum of said height and the thicknesses of said two flexible ribbon cables is greater than the sum of the heights of said indentations of said first stiff member and of said two stacked pliant members, so that, upon clamping said members together, said two flexible ribbon cables are compressed when placed, respectively, in said indentation of said first stiff member and in said indentation of the stacked pliant member adjacent said second stiff member protrusion;

a support for fixedly mounting said clamped members and said magnetic head, for fixing said clamped members and said flexible ribbon cables with respect to said connector, to provide strain relief of said flexible ribbon cables; and a servo for controllably moving said fixedly mounted clamped members and magnetic head.

12. The magnetic head assembly of claim 11, wherein at least a portion of said indentation of said first stiff member, at least a portion of said first surface of the one of said pliant members facing said first stiff member, and at least a portion of said indentation of the one of said pliant members facing said protrusion of said second stiff member, each has a flat engagement surface for engaging said flexible ribbon cables, said portions at least as wide as one of said flexible ribbon cables.

13. The magnetic head assembly of claim 12, wherein said members have a second portion inclined at an angle from each of said engagement surfaces, said inclined portions having the same angle with respect to said engagement surfaces for directing said flexible ribbon cables at said angle.

14. The strain relief clamp of claim 12, wherein each of said stiff members comprises a common part; and wherein each of said pliant members comprises a common part.

15. The magnetic head assembly of claim 12, wherein each of said flat engagement surfaces is textured.

16. The magnetic head assembly of claim 15, wherein said second firm member protrusion provides an engagement surface on at least portions of the total area of said protrusion, said engagement surface portions being textured and lying in a common flat plane.

17. A strain relief clamp for supporting at least one flexible ribbon cable, comprising:

a first stiff member having an indentation wider than said at least one flexible ribbon cable, and a height less than the thickness of said at least one flexible ribbon cable;

at least one pliant member stacked on said first stiff member, said at least one pliant member having a first surface on the side facing said first stiff member and an indentation on the side facing away from said first stiff member, said indentation substantially equal in width and height to said first stiff member indentation; and a second stiff member stacked on said at least one pliant member having a protrusion at least as wide as said at least one flexible ribbon cable facing said indentation of the adjacent said pliant member, said protrusion having a height such that the sum of said height and the thickness of said at least one flexible ribbon cable is greater than the sum of the heights of said indentations of said first stiff member and of said at least one pliant member, so that, upon clamping said members together, said at least one flexible ribbon cable is compressed when placed in said indentation of said at least one pliant member, to provide strain relief of said at least one flexible ribbon cable.

18. The strain relief clamp of claim 17, wherein at least a portion of said indentation of said at least one pliant member facing said second stiff member protrusion has a flat engagement surface for engaging said at least one flexible ribbon cable, said portion at least as wide as said at least one flexible ribbon cable.

19. The strain relief clamp of claim 18, wherein said members have a second portion inclined at an angle from each of said engagement surfaces, said inclined portions having the same angle with respect to said engagement surfaces for directing said at least one flexible ribbon cable at said angle.

20. The strain relief clamp of claim 18, wherein each of said stiff members comprises a common part; and wherein each of said pliant members comprises a common part.

21. The strain relief clamp of claim 18, wherein said at least one flat engagement surface is textured.

22. The strain relief clamp of claim 21, wherein said second firm member protrusion provides an engagement surface on at least portions of the total area of said protrusion, said engagement surface portions being textured and lying in a common flat plane.

23. A strain relief clamp for supporting a plurality of flexible ribbon cables, comprising:
- a first stiff member having an indentation wider than one of said flexible ribbon cables, and a height less than the thickness of one of said flexible ribbon cables;
- a plurality of stacked pliant members, said pliant members stacked on said first stiff member, each pliant member having a substantially flat surface on the side facing said first stiff member and an indentation on the side facing away from said first stiff member, said indentation substantially equal in width and height to said first stiff member indentation; and
- a second stiff member stacked on said pliant members having a protrusion at least as wide as one of said flexible ribbon cables facing said indentation of the adjacent said pliant member, said protrusion having a height such that the sum of said height and the thicknesses of said plurality of flexible ribbon cables is greater than the sum of the heights of said indentations of said first stiff member and of said plurality of stacked pliant members, so that, upon clamping said members together, said plurality of flexible ribbon cables are compressed when placed in said indentation of said first stiff member and in ones of said indentations of said plurality of stacked pliant members, to provide strain relief of said flexible ribbon cables.

24. The strain relief clamp of claim 23, wherein at least a portion of said indentation of said first stiff member, at least a portion of said substantially flat surface of the one of said pliant members facing said first stiff member, and at least a portion of said indentation of the one of said pliant members facing said protrusion of said second stiff member, each has a flat engagement surface for engaging said flexible ribbon cables, said portions at least as wide as one of said flexible ribbon cables.

25. The strain relief clamp of claim 24, wherein said members have a second portion inclined at an angle from each of said engagement surfaces, said inclined portions having the same angle with respect to said engagement surfaces for directing said plurality of flexible ribbon cables at said angle.

26. The strain relief clamp of claim 24, wherein each of said stiff members comprises a common part; and wherein each of said pliant members comprises a common part.

27. The strain relief clamp of claim 24, wherein each of said flat engagement surfaces is textured.

28. The strain relief clamp of claim 27, wherein said second firm member protrusion provides an engagement surface on at least portions of the total area of said protrusion, said engagement surface portions being textured and lying in a common flat plane.

* * * * *